United States Patent
Horowitz et al.

[11] 3,890,296
[45] June 17, 1975

[54] DIHYDROCHALCONE GALACTOSIDES AND THEIR USE AS SWEETENING AGENTS

[75] Inventors: Robert M. Horowitz, Pasadena; Bruno Gentili, Glendale, both of Calif.

[73] Assignee: The United States of America as represented by the Secretary of Agriculture, Washington, D.C.

[22] Filed: Apr. 8, 1974

[21] Appl. No.: 459,141

Related U.S. Application Data
[62] Division of Ser. No. 256,683, May 23, 1972.

[52] U.S. Cl................ 260/210 F; 426/213; 426/217
[51] Int. Cl............................................. C07c 47/18
[58] Field of Search.................................. 260/210 F

[56] References Cited
UNITED STATES PATENTS

| | | | |
|---|---|---|---|
| 3,087,821 | 4/1963 | Horowitz et al................. | 260/210 F |
| 3,153,035 | 10/1964 | Archer et al. ................... | 260/210 F |

*Primary Examiner*—Johnnie R. Brown
*Attorney, Agent, or Firm*—M. Howard Silverstein; Max D. Hensley; William Takacs

[57] ABSTRACT

Compounds of the structure

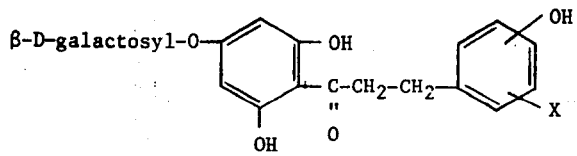

wherein X is hydrogen, hydroxy, or lower alkoxy. These compounds are intensely sweet, and are useful for sweetening foods and other edible substances.

2 Claims, No Drawings

DIHYDROCHALCONE GALACTOSIDES AND THEIR USE AS SWEETENING AGENTS

This is a division of our copending application Ser. No. 256,083, filed May 23, 1972.

DESCRIPTION OF THE INVENTION

This invention relates in general to the art of imparting sweetness to edible materials, particularly food products. The objects of the invention include the provision of new organic compounds—namely, dihydrochalcone galactosides—which exhibit intense sweetness. Additional objects of the invention are the provision of novel methods and compositions of matter wherein these compounds are used. Further objects of the invention will be evident from the following description wherein parts and percentages are by weight unless otherwise specified.

The dihydrochalcone galactosides of the invention, which are compounds not heretofore known, have the following structure -

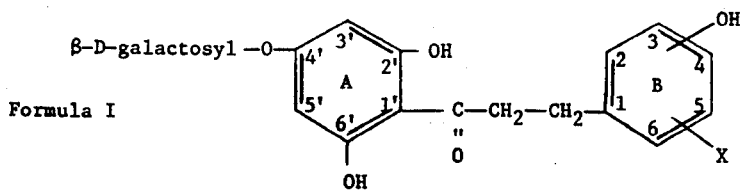

Formula I wherein X represents a radical selected from the category consisting of hydrogen, hydroxy, and lower alkoxy. (The letters A and B are included in the above formula for identification of the respective benzene rings; the numbers within the rings are intended to identify the various positions.)

Because of their extraordinary sweetness, the compounds of the invention are useful as sweetening agents for foods and other products of all kinds. It is further to be noted that the sweetness of our compounds is of such an intense degree—comparable to or higher than that of saccharin, which is some 300 to 500 times sweeter than sucrose—that it cannot possibly be attributed to the mere presence of a galactose residue attached to the aglycone moiety.

Moreover, the fact that our compounds are intensely sweet involves a surprising discovery since there is nothing in the prior art to suggest that these compounds would exhibit such a property.

In our U.S. Pat. No. 3,087,821 we disclose a series of dihydrochalcone glycosides which differ from those of this invention in respect to the nature of the sugar radical attached to the A ring. It is explained in said patent that the nature of this substituent is critical in that only wherein it is β-D-glucosyl or β-neohesperidosyl do the compounds exhibit any useful degree of sweetness, and that compounds containing the residues of other sugars are tasteless. In view of this teaching one would expect that if the substituent in question were the galactosyl radical, the resulting compound would not be sweet.

The compounds of the invention can be prepared from the corresponding flavanones by known methods, typically by applying the following steps: (1) Attachment of the galactosyl radical to the 7-hydroxy group of the flavanone, (2) conversion of the resulting flavanone galactoside to the corresponding chalcone, and (3) reduction of the latter to the dihydrochalcone. Details on these steps are provided below.

In the first step the flavanone is reacted with a suitably protected halogen derivative of galactose under alkaline conditions. This results in glycoside formation at the 7-position of the flavanone, yielding a flavanone-7-galactoside. (It may be noted that the 7-position of the flavanone corresponds to the 4'-position in the chalcone and dihydrochalcone forms.) An example of a suitably protected halogen derivative of galactose is 2,3,4,6-tetra-O-acetyl-α-D-galactopyranosyl bromide (commonly known as α-acetobromogalactose) which has the structure

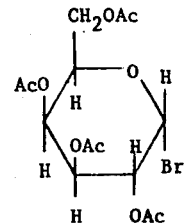

wherein Ac stands for $CH_3$—CO—. Other reagents which may be employed for the glycoside formation are, for example, α-benzoylbromogalactose and α-acetochlorogalactose.

Following formation of the glycoside, the reaction product is warmed with 5–10% aqueous NaOH or KOH to hydrolyze the acetoxy groups. Acidification of the hydrolyzed product with hydrochloric acid yields the flavanone galactoside intermediate which may be purified by conventional techniques such as recrystallization.

In the next step the flavanone galactoside is treated with aqueous alkali in order to open the heterocyclic ring between the 1- and 2-positions and produce the chalcone form of the flavanone galactoside. Next, the ethylenic double bond in the chalcone is hydrogenated to form the dihydrochalcone. This is readily accomplished by contacting the chalcone with hydrogen gas in the presence of a hydrogenation catalyst such as finelydivided platinum, palladium, or Raney nickel. The dihydrochalcone, being soluble in water and stable therein, can be purified by recrystallization from water solutions in conventional manner.

The synthesis is illustrated by the following formulas wherein X designates H, OH, or lower alkoxy.

mum sweetness subsists in those compounds where the said hydroxy group is at the 3- or 4-positions. In general, the compounds containing two hydroxy groups are less sweet than those with a single 3-hydroxy or 4-hydroxy group. On the other hand, the compounds which contain a hydroxy group and a lower alkoxy group are as sweet or even sweeter than the aforesaid compounds having a single 3-hydroxy or 4-hydroxy group. This is particularly the case where the hydroxy

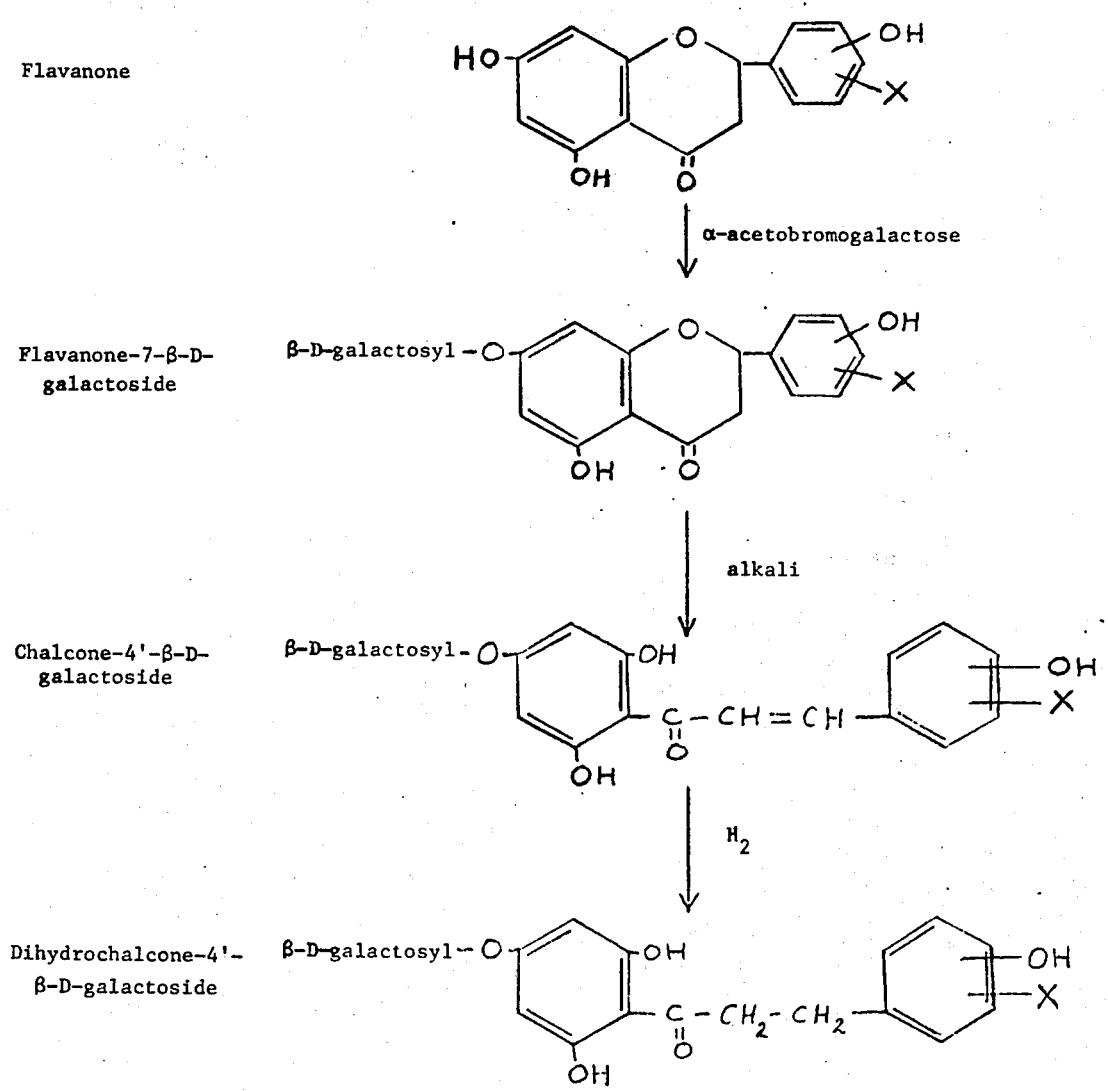

Flavanone

Flavanone-7-β-D-galactoside

Chalcone-4'-β-D-galactoside

Dihydrochalcone-4'-β-D-galactoside

In an alternative procedure, the product of the alkaline hydrolysis of step 1 (being necessarily in chalcone form because of the alkaline conditions) can be directly hydrogenated to yield the desired dihydrochalcone galactoside.

As mentioned previously, the compounds of the invention are extremely sweet. However, there is substantial variation in sweetness among the individual compounds, depending on the nature and number of substituents on ring B. For example, where the only substituent is the hydroxy group (X being H), maximum group is at position 3 and a lower alkoxy group (methoxy, ethoxy, propoxy, or isopropoxy) is at position 4.

Typical examples of compounds within the scope of the invention are listed below by way of illustration but not limitation. The structure of these compounds is as shown above in Formula I wherein substituent or substituents on ring B have the stated values and positions:

Naringenin dihydrochalcone 4'-galactoside. Ring B contains a single hydroxy group at position 4.

2',3,6'-Trihydroxy-dihydrochalcone 4'-galactoside. Ring B contains a single hydroxy group at position 3.

Eriodictyol dihydrochalcone 4'-galactoside. Ring B contains two hydroxy groups, one at position 3, the other at position 4.

Hesperetin dihydrochalcone 4'-galactoside. Ring B contains a hydroxy group at position 3, a methoxy group at position 4.

2',3,6'-Trihydroxy-4-ethoxy-dihydrochalcone 4'-galactoside. Ring B contains a hydroxy group at position 3, and an ethoxy group at position 4.

2',3,6'-Trihydroxy-4-n-propoxy-dihydrochalcone 4'-galactoside. Ring B contains a hydroxy group at position 3, and an n-propoxy group at position 4.

2',3,6'-Trihydroxy-4-isopropoxy-dihydrochalcone 4'-galactoside. Ring B contains a hydroxy group at position 3, and an isopropoxy group at position 4.

2,2',6'-Trihydroxy-3-methoxy-dihydrochalcone 4'-galactoside. Ring B contains a hydroxy group at position 2, and a methoxy group at position 3.

EXAMPLE

The invention is further demonstrated by the following illustrative example.

Hesperetin 7-$\beta$-D-Galactoside

A mixture of hesperetin (5.7 g.), $\alpha$-acetobromogalactose (15.5 g.), anhydrous potassium carbonate (30 g.), and acetone (200 ml.) was shaken at room temperature for 20 hours. The mixture was filtered, the filtrate taken to dryness and the residue deacetylated by warming it in 3N aqueous sodium hydroxide (40 ml.) for 15 minutes. On cooling to room temperature, the crude potassium salt of the title compound crystallized out (2.3 g. after washing with aqueous methanol and drying). This was slurried in aqueous methanol, acidified with concentrated hydrochloric acid and kept overnight in a refrigerator. Hesperetin 7-$\beta$-D-galactoside was obtained as a tan-colored solid (1.7 g.), m.p. about 205° C. Recrystallized from methanol it was obtained as light-tan needles, m.p. 222°–3° C. It gave the ultraviolet and proton magnetic resonance spectra expected for hesperetin substituted on the 7-hydroxy group by a $\beta$-D-galactosyl residue.

Hesperetin Dihydrochalcone 4'-$\beta$-D-Galactoside

A solution of hesperetin 7-$\beta$-D-galactoside (0.8 g.) in 10% aqueous potassium hydroxide (10 ml.) containing 10% palladium-carbon catalyst (0.3 g.) was shaken with hydrogen at 30 p.s.i. for 3 hours. The catalyst was filtered out and the filtrate acidified with hydrochloric acid in an ice-bath. The oily precipitate crystallized overnight. It was recrystallized from water to give 0.47 g. of hesperetin dihydrochalcone 4'-$\beta$-D-galactoside (or more precisely, 3,2',6'-trihydroxy-4-methoxy-4'-$\beta$-D-galactosyloxy dihydrochalcone) in the form of light-tan needles, m.p. 129°–131° C. It gave the ultra-violet and proton magnetic resonance spectra expected for hesperetin dihydrochalcone substituted on the 4'-hydroxy group by a $\beta$-D-galactosyl residue.

Taste Tests

Taste tests were conducted with hesperetin dihydrochalcone 4'-$\beta$-D-galactoside, known dihydrochalcone sweeteners, and saccharin. The results are tabulated below.

| Compound | Relative sweetness (molar basis) |
|---|---|
| Hesperetin dihydrochalcone 4'-$\beta$-D-galactoside | 1.5 – 2.0 |
| Hesperetin dihydrochalcone 4'-glucoside | 1 |
| Naringin dihydrochalcone | 1 |
| Neohesperidin dihydrochalcone | 20 |
| Saccharin (Na) | 1 |

Moreover, it was observed that although the compound of the invention is less sweet than neohesperidin dihydrochalcone, its sweetness is pleasant and less clinging than that of the latter compound.

As noted above, the dihydrochalcones of the invention are very sweet. Moreover, they are soluble in water and stable, even in aqueous solution. As a result, they are useful for sweetening all types of materials which are intended for consumption or at least for contact with the mouth of the user, such materials being herein generically designated as edible materials. Typical illustrative examples of edible materials which may be sweetened with the compounds of the invention are fruits; vegetables; juices or other liquid preparations made from fruits or vegetables; meat products, particularly those conventionally treated with sweetened liquors, i.e., bacon and ham; milk products such as chocolate dairy drinks; egg products such as nogs, custards, angel food mixes; salad dressings; pickles and relishes; ice creams, sherbets, and ices; ice milk products; bakery products; icings; confections and confection toppings, syrups, and flavors; cake and pastry mixes; beverages such as carbonated soft drinks, fruit ades; wines; dietary-type foods; cough syrups and other medicinal preparations intended for oral administrations; dental preparations such as pastes, powders, foams and denture-retaining adhesives; mouth washes and similar oral antiseptic liquids; tobacco products; adhesives for gumming stamps, envelopes and labels, etc. In using the compounds of the invention, they are incorporated in the material to be sweetened in the amount required to attain the desired level of sweetness. Ordinarily, because of their intense sweetness, the compounds are employed in a very minor proportion, that is, in a concentration of 1% or less, usually less than 0.5%. It is obvious, however, that there is nothing critical about the concentration of dihydrochalcone which is used; it is simply a matter of attaining a desired sweetness level appropriate to the material in question. Moreover, the technique of sweetening materials with the compounds of the invention offers no difficulty as the selected dihydrochalcone is simply incorporated with the material to be sweetened. The dihydrochalcones may be added directly to the material or they may be first incorporated with a diluent to increase their bulk so that small amounts of the compounds may be metered into the material. As diluents one may use liquid or solid carriers such as water, glycerol, starch, sorbitol, salt, sugar, citric acid or other non-toxic substance compatible with the material to be sweetened.

Having thus described the invention, what is claimed is:

1. A compound of the formula
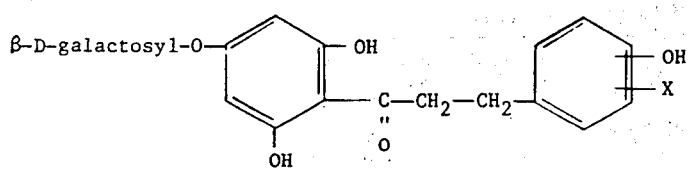
wherein X represents a radical selected from the group consisting of hydrogen, hydroxy, and lower alkoxy.
2. A compound of the formula
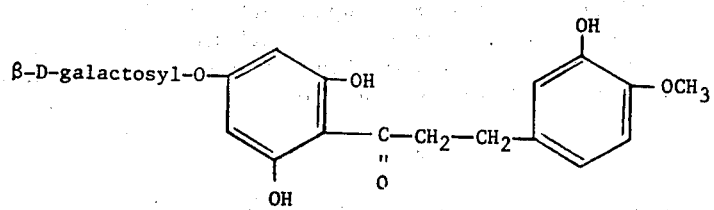
* * * * *